United States Patent
Watanabe et al.

(10) Patent No.: US 8,527,174 B2
(45) Date of Patent: Sep. 3, 2013

(54) BRAKE CONTROLLING APPARATUS

(75) Inventors: Ryochi Watanabe, Susono (JP); Hidehisa Kato, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 108 days.

(21) Appl. No.: 13/124,804

(22) PCT Filed: Dec. 9, 2008

(86) PCT No.: PCT/JP2008/072305
§ 371 (c)(1),
(2), (4) Date: Apr. 18, 2011

(87) PCT Pub. No.: WO2010/067416
PCT Pub. Date: Jun. 17, 2010

(65) Prior Publication Data
US 2011/0231076 A1  Sep. 22, 2011

(51) Int. Cl.
*G06F 19/00* (2011.01)
*G06G 7/00* (2006.01)
*G06G 7/76* (2006.01)

(52) U.S. Cl.
USPC ............. 701/70; 188/152; 303/121; 701/78

(58) Field of Classification Search
USPC .................. 701/70, 78; 188/152; 303/121
See application file for complete search history.

(56) References Cited

U.S. PATENT DOCUMENTS

| | | |
|---|---|---|
| 4,861,118 A | 8/1989 | Burckhardt et al. |
| 5,261,731 A | 11/1993 | Yogo et al. |
| 5,711,582 A * | 1/1998 | Koike ............................ 303/11 |
| 7,699,411 B2 | 4/2010 | Nakaura et al. |
| 2008/0207391 A1 | 8/2008 | Ikematsu et al. |

FOREIGN PATENT DOCUMENTS

| | | |
|---|---|---|
| DE | 38 39 178 A1 | 8/1989 |
| JP | A-64-28060 | 1/1989 |
| JP | A-6-135311 | 5/1994 |
| JP | A-8-310371 | 11/1996 |
| JP | A-9-104336 | 4/1997 |
| JP | A-2005-262998 | 9/2005 |
| JP | A-2006-69346 | 3/2006 |
| JP | A-2007-91051 | 4/2007 |
| JP | 2008-290474 A * | 12/2008 |
| JP | A-2008-290474 | 12/2008 |

OTHER PUBLICATIONS

International Search Report mailed Jan. 20, 2009 issued in International Patent Application No. PCT/JP2008/072305 (with translation).

* cited by examiner

*Primary Examiner* — Mary Cheung
*Assistant Examiner* — Frederick Brushaber
(74) *Attorney, Agent, or Firm* — Oliff & Berridge, PLC

(57) ABSTRACT

A brake controlling apparatus (electronic control unit) of a braking device including a booster valve to be opened at a time of request to boost a pressure of a brake liquid to supply to a wheel to be controlled, and a piston pump for supplying pressurized brake liquid to an upstream side of the booster valve, the brake controlling apparatus including a brake liquid pressure controlling unit that sets a duty ratio between a closing period and a opening period of the booster valve so that a dischargeable period of the brake liquid in the piston pump appears in the opening period of the booster valve and controls the booster valve based on the duty ratio.

4 Claims, 5 Drawing Sheets

BRAKE CONTROLLING APPARATUS

TECHNICAL FIELD

The present invention relates to a brake controlling apparatus for performing an operation control of a braking device using a piston pump for pressurizing a brake liquid.

BACKGROUND ART

A brake actuator of the braking device is conventionally configured by a plurality of electromagnetic valves arranged on a path of the brake liquid, a pressurization pump for pressurizing the brake liquid to supply to the wheel to realize a request to boost the brake liquid with respect to the relevant wheel, a motor for driving the pressurization pump, and the like. The known pressurization pump includes not only a gear pump in which the brake liquid is taken in and discharged with the rotation of the gear generally used in the conventional art, but also a piston pump in which the brake liquid is taken in and discharged by the reciprocating movement of the piston that excels in terms of cost price. For instance, the braking device including the piston pump is described in Patent Document 1. In the braking device of Patent Document 1, the timing to take in and discharge the brake liquid by the piston pump and the timing to open and close the electromagnetic valve (first electromagnetic open/close valve 46 and second electromagnetic open/close valves 48, 50) are synchronized to enhance the controllability of the brake liquid pressure.

Patent Document 2 describes a braking device in which an electromagnetic valve is arranged on a flow path of the brake liquid from a high hydraulic pressure source to a brake actuator, and the braking hydraulic pressure to supply to the brake actuator is controlled by adjusting a duty ratio of a drive signal of the electromagnetic valve. In such a braking device, a cycle of the drive signal is determined according to a vehicle speed, and a current is flowed to the electromagnetic valve according to the cycle.

Patent Document 1: Japanese Patent Application Laid-open No. H08-310371
Patent Document 2: Japanese Patent Application Laid-open No. H01-028060
Patent Document 3: Japanese Patent Application Laid-open No. 2006-069346

DISCLOSURE OF INVENTION

Problem to be Solved by the Invention

The gear pump can continue to discharge substantially a constant amount of brake liquid on a constant basis. The piston pump, on the other hand, takes in the brake liquid when the piston moves in one direction and discharges the brake liquid when the piston moves in the other direction, and thus a period in which the brake liquid can be discharged and a period in which the brake liquid cannot be discharged exists while the piston makes one reciprocation due to the structure. Therefore, the pressure boost amount of the brake liquid pressure becomes small when the non-dischargeable period of the brake liquid and the request period to boost the brake liquid pressure to the wheel to be controlled overlap, whereby the requested brake liquid pressure with respect to the wheel becomes difficult to generate when necessary. That is, when the piston pump is used as the pressurization pump of the brake actuator, the requested brake liquid pressure to the wheel to be controlled is not satisfied at an appropriate timing, and the requested braking force with respect to the wheel may not be generated when necessary.

Patent Document 3 describes a technique of observing a behavior of a vehicle based on information such as yaw rate, and stabilizing the behavior of the vehicle by applying the braking force on a predetermined wheel if possibility of occurrence of disturbance in the behavior of a yaw motion direction is detected. When the braking device with a brake actuator that uses a piston pump to generate the braking force is used, an increase request period of the braking force to the predetermined wheel and a non-dischargeable period of the brake liquid in the piston pump may overlap, in which case, the requested braking force with respect to the wheel may not be generated at the desired timing and the control accuracy of the vehicle behavior control may lower.

In view of improving the drawbacks of the conventional art, it is an object of the present invention to provide a brake controlling apparatus capable of enhancing the control accuracy at the time of the boost request of the brake liquid pressure in the braking device that uses the piston pump.

Means for Solving Problem

In order to achieve the above mentioned object, in the present invention, a brake controlling apparatus of a braking device including a booster valve to be opened at a time of request to boost a pressure of a brake liquid to supply to a wheel to be controlled and a piston pump for supplying pressurized brake liquid to an upstream side of the booster valve, includes the brake liquid pressure controlling means sets the duty ratio of the booster valve so that the opening period of the booster valve becomes at least a period of longer than or equal to one cycle of the piston pump.

In order to achieve the above mentioned object, in the present invention, a brake controlling apparatus of a braking device including a booster valve to be opened at a time of request to boost a pressure of a brake liquid to supply to a wheel to be controlled, and a piston pump for supplying pressurized brake liquid to an upstream side of the booster valve, includes a brake liquid pressure controlling means that sets a duty ratio between a closing period and a opening period of the booster valve so that the opening period of the booster valve becomes at least a dischargeable period of the brake liquid in the piston pump, and controls the booster valve based on the duty ratio, wherein the brake liquid pressure controlling means sets the duty ratio of the booster valve based on an output rotation number of the electric motor as a drive source of the piston pump.

It is preferable that the brake liquid pressure controlling means sets the duty ratio of the booster valve so that the opening period of the booster valve becomes at least an inverse number of an output rotation number per one second of the electric motor.

It is preferable that the brake liquid pressure controlling means is configured to set the duty ratio of the booster valve when a master cylinder pressure to apply on the upstream side of the booster valve is lower than the pressure of the brake liquid to the wheel to be controlled.

Effect of the Invention

The brake controlling apparatus according to the present invention open/close controls the booster valve so that the dischargeable period of the brake liquid in the piston pump appears in the opening period (boost request period of the brake liquid pressure to the wheel to be controlled) of the booster valve, and thus can step up the brake liquid pressure to the wheel to be controlled at the desired magnitude and timing. Therefore, the requested braking force is generated at the desired timing at the wheel to be controlled. That is, the control accuracy of the brake liquid pressure to the wheel to be controlled at the time of boost request can be maintained in a satisfactory state although the piston pump which is advantageous than the gear pump in terms of cost price but cannot discharge the brake liquid on a constant basis is used, so that the desired appropriate fluid pressure can be supplied to the wheel to be controlled and the desired appropriate braking force can be generated at the wheel. For instance, the desired braking control having satisfactory control accuracy can be realized since an appropriate braking force can be generated with respect to each wheel during the braking control. Furthermore, the behavior of the vehicle can be stabilized under satisfactory control accuracy since an appropriate braking force can be generated with respect to the wheel to be controlled during the vehicle behavior control.

EXPLANATION OF LETTERS OR NUMERALS

Figure 1:
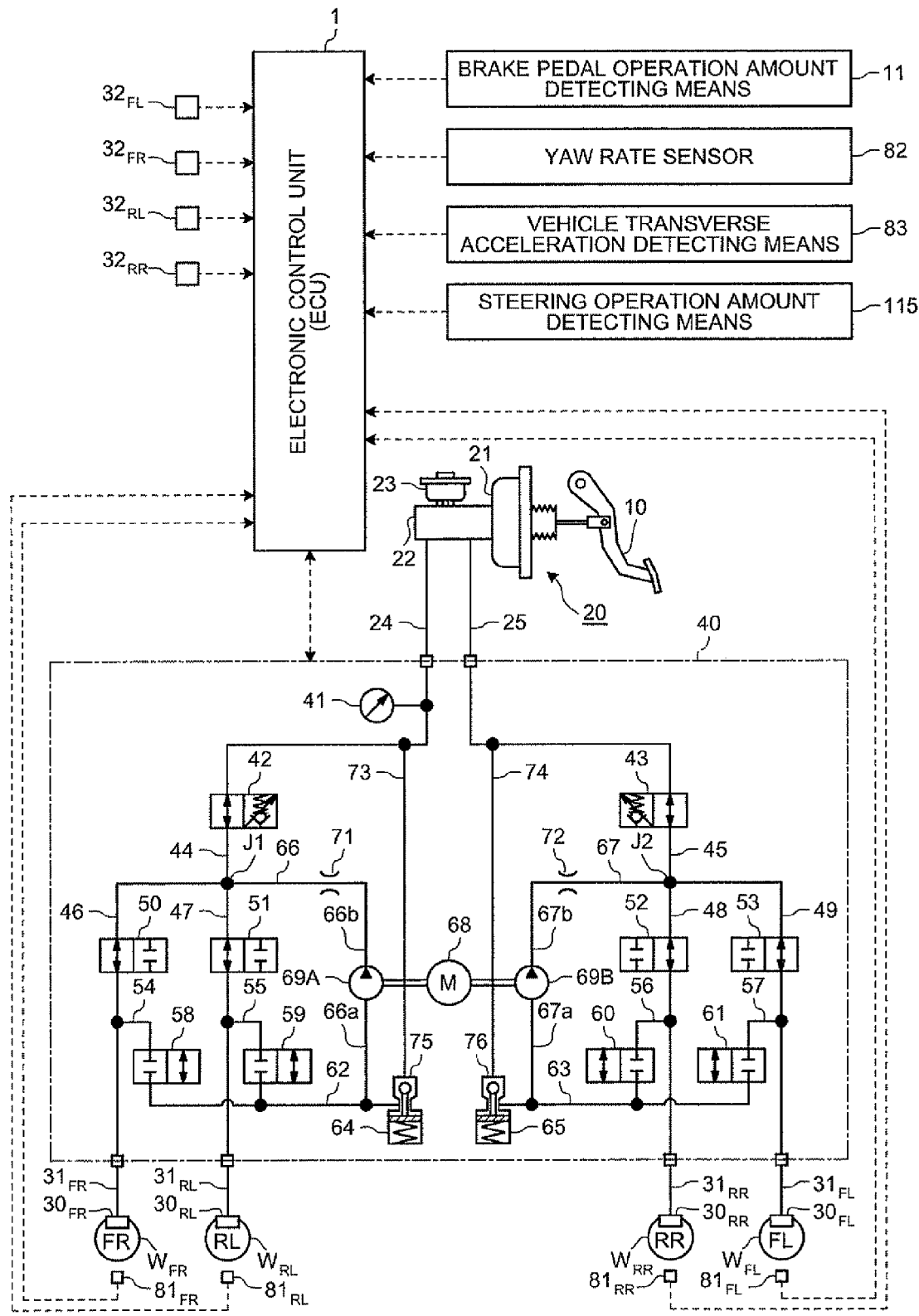
FIG. 1 is a view showing one example of a braking device to be controlled by a brake controlling apparatus according to the present invention.

1 Electronic control unit (ECU)
10 Brake pedal
11 Brake pedal operation amount detecting means
20 Brake liquid pressure generating means
$30_{FL}$, $30_{FR}$, $30_{RL}$, $30_{RR}$ Braking force generating means
40 Brake liquid pressure adjusting means
42, 43 Master cut valve
50, 51, 52, 53 Booster valve
58, 59, 60, 61 Depressurization valve
68 Electric motor
68b Eccentric cam
69 Opposed type piston pump
69A, 69B Piston pump (pressurization pump)
$81_{FL}$, $81_{FR}$, $81_{RL}$, $81_{RR}$ Wheel speed detecting means
82 Yaw rate sensor
83 Vehicle transverse acceleration detecting means
100 Vehicle
111 Steering wheel
113 Steering torque transmitting means
114L, 114R Tie rod
115 Steering operation amount detecting means
691A, 691B Piston
692A, 692B Elastic member
$W_{FL}$, $W_{FR}$, $W_{RL}$, $W_{RR}$ Wheel

BEST MODE(S) FOR CARRYING OUT THE INVENTION

Hereinafter, an embodiment of a brake controlling apparatus according to the present invention will be described in detail based on the drawings. It is understood that the present invention is not to be limited by the embodiment.

Embodiment

An embodiment of a brake controlling apparatus according to the present invention will be described based on FIG. 1 to FIG. 6.

The brake controlling apparatus of the present embodiment performs the control of braking torque (braking force) generated with respect to each wheel $W_{FL}$, $W_{FR}$, $W_{RL}$, $W_{RR}$ by a braking device, to be described later, and is prepared as one function of an electronic control unit (ECU) 1 shown in FIG. 1. The electronic control unit 1 is configured by a CPU (Central Processing Unit) (not shown), ROM (Read Only Memory) for storing a predetermined control program etc. in advance, RAM (Random Access Memory) for temporarily storing the calculation result of the CPU, backup RAM for storing information etc. prepared in advance, and the like.

First, one example of a braking device to be controlled by the brake controlling apparatus is shown in FIG. 1. A vehicle is mounted with a power source such as an engine or a motor (not shown), and travels by transmitting the power of the power source to the drive wheel as drive force. The braking device is used to stop or decelerate the vehicle that is traveling, and is configured to generate a target braking torque (target braking force) at individual magnitude with respect to each wheel $W_{FL}$, $W_{FR}$, $W_{RL}$, $W_{RR}$. Here, the frictional force is generated between engaging elements using the force of the brake liquid pressure to act the target braking torque (target braking force) on the wheels $W_{FL}$, $W_{FR}$, $W_{RL}$, $W_{RR}$.

As shown in FIG. 1, the braking device includes a brake pedal 10 to be operated by a driver, a brake liquid pressure generating means 20 for generating the brake liquid pressure corresponding to an operation amount of the brake pedal 10, a braking force generating means (drum brake, disc brake, etc.) $30_{FL}$, $30_{FR}$, $30_{RL}$, $30_{RR}$ for each wheel $W_{FL}$, $W_{FR}$, $W_{RL}$, $W_{RR}$ for generating the braking force by being supplied with the brake liquid pressure, and a brake liquid pressure adjusting means 40 for supplying the brake liquid pressure generated by the brake liquid pressure generating means 20 as is or adjusting such brake liquid pressure for each wheel $W_{FL}$, $W_{FR}$, $W_{RL}$, $W_{RR}$ and supplying to the respective braking force generating means $30_{FL}$, $30_{FR}$, $30_{RL}$, $30_{RR}$ (specifically, cylinder of the braking force generating means $30_{FL}$, $30_{FR}$, $30_{RL}$, $30_{RR}$ such as a wheel cylinder of the drum brake, a cylinder in a caliper of the disc brake, etc.).

First, the brake liquid pressure generating means 20 includes a braking servo means (brake booster) 21 for doubling an operation pressure (pedal depression force) involved in brake operation of the driver input to the brake pedal 10 at a predetermined double force ratio, a master cylinder 22 for converting the pedal depression force doubled by the braking booster 21 to the brake liquid pressure (hereinafter referred to as "master cylinder pressure") Pmc corresponding to the operation amount of the brake pedal 10, and a reservoir tank 23 for storing the brake liquid.

Two brake liquid pressure chambers (hydraulic pressure chambers) (not shown) are arranged inside the master cylinder 22, and the master cylinder pressure Pmc is generated in the respective brake liquid pressure chambers. One of the master cylinder pressure Pmc generated in the respective brake liquid pressure chambers is supplied to a first brake liquid pressure circuit system, to be described later, of the brake liquid pressure adjusting means 40, and the other is supplied to a second brake liquid pressure circuit system, to be described later, of the brake liquid pressure adjusting means 40. Therefore, the braking device of the present embodiment includes first and second brake liquid pressure pipings 24, 25 having one of respective ends connected to the respective brake liquid pressure chambers, and the other end connected to the first brake liquid pressure circuit system and the second brake liquid pressure circuit system, respectively. For instance, the master cylinder pressure Pmc is supplied to the right front wheel $W_{FR}$ and the left rear wheel $W_{RL}$ according to the control mode, to be described later, of the first brake liquid pressure circuit system, and to the left front wheel $W_{FL}$ and the right rear wheel $W_{RR}$ according to the control mode, to be described later, of the second brake liquid pressure circuit system.

The brake liquid pressure adjusting means 40 will now be described. The brake liquid pressure adjusting means 40 is a so-called brake actuator for supplying the brake liquid pressure (master cylinder pressure Pmc) in the first and second brake liquid pressure pipings 24, 25 as is or adjusting such brake liquid pressure to the respective braking force generating means $30_{FR}$, $30_{RL}$, $30_{RR}$, $30_{FL}$. The brake liquid pressure adjusting means 40 operates according to a control command of the brake liquid pressure controlling means of the electronic control unit 1. In the following description, the brake liquid pressure supplied to the braking force generating means $30_{FR}$, $30_{RL}$, $30_{RR}$, $30_{FL}$ is referred to as the "brake cylinder pressure Pbc".

The brake liquid pressure adjusting means 40 of the present embodiment is illustrated to include the first brake liquid pressure circuit system for controlling and transmitting the brake cylinder pressure Pbc with respect to the right front wheel $W_{FR}$ and the left rear wheel $W_{RL}$, and the second brake liquid pressure circuit system for controlling and transmitting the brake cylinder pressure Pbc with respect to the left front wheel $W_{FL}$ and the right rear wheel $W_{RR}$. That is, the brake liquid pressure adjusting means 40 has a structure including the brake liquid pressure circuit of a so-called X-piping. The upstream side (master cylinder 22 side) of the first brake liquid pressure circuit system is connected to the first brake liquid pressure piping 24 and the downstream side is connected to a brake liquid pressure piping $31_{FR}$ of the right front wheel $W_{FR}$ and a brake liquid pressure piping $31_{RL}$ of the left rear wheel $W_{RL}$. The upstream side of the second brake liquid pressure circuit system is connected to the second brake liquid pressure piping 25 and the downstream side is connected to a brake liquid pressure piping $31_{RR}$ of the right rear wheel $W_{RR}$ and a brake liquid pressure piping $31_{FL}$ of the left front wheel $W_{FL}$. In the embodiment, the upstream side and the downstream side in the flowing direction of the brake liquid at the time of pedal operation (i.e., direction towards braking force generating means $30_{FL}$, $30_{FR}$, $30_{RL}$, $30_{RR}$) are respectively the upstream side and the downstream side of the brake liquid pressure circuit of the braking device.

The brake liquid pressure adjusting means 40 includes a master cylinder pressure sensor 41 for detecting the brake liquid pressure (i.e., master cylinder pressure Pmc) supplied from the brake liquid pressure generating means 20. The master cylinder pressure sensor 41 is arranged on one of either the first or second brake liquid pressure pipings 24, 25, and transmits the detection signal to the electronic control unit 1. The master cylinder pressure sensor 41 is illustrated as being arranged on the first brake liquid pressure piping 24 herein.

The brake liquid pressure adjusting means 40 also includes master cut valves 42, 43 serving as a flow rate adjusting means of the brake liquid in the first and second brake liquid pressure circuit systems, respectively. The upstream side of each master cut valve 42, 45 is connected to the first and second brake liquid pressure pipings 24, 25, respectively, and the master cut valve 42 is arranged on the downstream of the master cylinder pressure sensor 41. Such master cut valves 42, 43 are flow rate adjusting electromagnetic valves of a so-called constantly-open type that are usually in the open state, where the control of the valve opening is executed with the current flow by the brake liquid pressure controlling means of the electronic control unit 1. For instance, when the valve opening is controlled according to the current flow amount, the respective master cut valves 42, 43 release one part of the pressure of the brake liquid discharged from pressurization pumps 69A, 69B, to be described later, towards the master cylinder 22 side to adjust the brake liquid pressure to supply to the braking force generating means $30_{FR}$, $30_{RL}$, $30_{RR}$, $30_{FL}$ side.

The downstream side of each master cut valve 42, 43 is connected to a coupling passage 44, 45, respectively. That is, in the brake liquid pressure adjusting means 40, the first brake liquid pressure piping 24 is connected to the coupling passage 44 through the master cut valve 42, and the second brake liquid pressure piping 25 is connected to the coupling passage 45 through the master cut valve 43. Two branched passages 46, 47 are connected to the coupling passage 44 of the first brake liquid pressure circuit system so as to be branched therefrom, and two branched passages 48, 49 are connected to the coupling passage 45 of the second brake liquid pressure circuit system so as to be branched therefrom. In the first brake liquid pressure circuit system, the respective branched passages 46, 47 is connected to the brake liquid pressure piping $31_{FR}$ of the right front wheel $W_{FR}$ and the brake liquid pressure piping $31_{RL}$ of the left rear wheel $W_{RL}$. In the second brake liquid pressure circuit system, the respective branched passages 48, 49 is connected to the brake liquid pressure piping $31_{RR}$ of the right rear wheel $W_{RR}$ and the brake liquid pressure piping $31_{FL}$ of the left front wheel $W_{FL}$.

A brake liquid pressure adjusting unit capable of individually adjusting the brake cylinder pressure Pbc to the respective braking force generating means $30_{FR}$, $30_{RL}$, $30_{RR}$, $30_{FL}$ is arranged for every wheel $W_{FR}$, $W_{RL}$, $W_{RR}$, $W_{FL}$ on each branched passage 46, 47, 48, 49. Each brake liquid pressure adjusting unit has a pressure boost mode of boosting the brake cylinder pressure Pbc to the respective braking force generating means $30_{FL}$, $30_{FR}$, $30_{RL}$, $30_{RR}$ to be controlled, a holding mode of holding the brake cylinder pressure Pbc at the magnitude of the relevant point, and a depressurization mode of depressurizing the brake cylinder pressure Pbc for the main brake liquid pressure control mode.

The respective brake liquid pressure adjusting units are configured by booster valves (also referred to as holding valves) 50, 51, 52, 53, brake liquid pressure discharge passages 54, 55, 56, 57, and depressurization valves 58, 59, 60, 61 prepared for every wheel $W_{FR}$, $W_{RL}$, $W_{RR}$, $W_{FL}$. The booster valves 50, 51, 52, 53 are respectively arranged on each branched passage 46, 47, 48, 49. Each of the brake liquid pressure discharge passages 54, 55, 56, 57 is connected to the downstream side than each booster valve 50, 51, 52, 53 in each branched passage 46, 47, 48, 49 so as to be branched therefrom. The depressurization valves 58, 59, 60, 61 are arranged on each brake liquid pressure discharge passage 54, 55, 56, 57, respectively.

The respective booster valves 50, 51, 52, 53 are electromagnetic valves of so-called constantly-open type and are in an open state in the usual time of non-excitation state, and are closed when becoming the excitation state with the current flow by the brake liquid pressure controlling means of the electronic control unit 1. Each depressurization valve 58, 59, 60, 61, on the other hand, is an electromagnetic valve of a so-called constantly-closed type and is in a closed state in the usual time of non-excitation state, and is opened when becoming the excitation state with the current flow by the brake liquid pressure controlling means.

A brake liquid pressure discharge assembled passage 62 that unites the respective brake liquid pressure discharge passages 54, 55 of the first brake liquid pressure circuit system, and a brake liquid pressure discharge assembled passage 63 that unites the respective brake liquid pressure discharge passages 56, 57 of the second brake liquid pressure circuit system are prepared, where each brake liquid pressure discharge assembled passage 62, 63 is connected to an auxiliary reservoir 64, 65, respectively.

Furthermore, a pump passage 66 branched from a branched point J1 of the coupling passage 44 and each branched passage 46, 47 and connected to the brake liquid pressure discharge assembled passage 62 is arranged in the first brake liquid pressure circuit system. Similarly, a pump passage 67 branched from a branched point J2 of the coupling passage 45 and each branched passage 48, 49 and connected to the brake liquid pressure discharge assembled passage 63 is arranged in the second brake liquid pressure circuit system.

The pressurization pumps 69A, 69B of the first brake liquid pressure circuit system side and the second brake liquid pressure circuit system side driven by one electric motor 68 are arranged on the pump passages 66, 67, respectively. Each pump passage 66, 67 is configured by a passage on the intake side of the brake liquid (hereinafter referred to as "pump intake side passage) 66a, 67a of the pressurization pump 69A, 69B, and a passage on the discharge side of the brake liquid (hereinafter referred to as "pump discharge side passage) 66b, 67b of the pressurization pump 69A, 69B. Each pump intake side passage 66a, 67a has one end connected to the brake liquid pressure discharge assembled passage 62, 63 and the other end connected to the intake port of the pressurization pump 69A, 69B. Each pump discharge side passage 66b, 67b has one end connected to the discharge port of the pressurization pump 69A, 69B, and the other end connected to the branched point J1, J2.

Each pressurization pump 69A, 69B is a brake liquid pressurizing means for pumping up the brake liquid through the pump intake side passage 66a, 67a from the auxiliary reservoir 64, 65 and pressurizing the same, and discharging the brake liquid towards each branched point J1, J2, and supplies the pressurized brake liquid pressure (hereinafter referred to as "pressurized brake pressure") Pba towards each branched point J1, J2. The brake liquid pressure controlling means of the electronic control unit 1 operates the pressurization pumps 69A, 69B corresponding to the braking force generating means $30_{FL}$, $30_{FR}$, $30_{RL}$, $30_{RR}$ to be boosted when the boost request (hereinafter referred to as "pressurization brake request") of the brake cylinder pressure Pbc of the braking force generating means $30_{FL}$, $30_{FR}$, $30_{RL}$, $30_{RR}$ using the pressurized brake pressure Pba is made.

In the first brake liquid pressure circuit system, the pressurized brake pressure Pba is supplied to the brake liquid pressure piping (upstream side of booster valves 50, 51 on pump discharge side passage 66b, coupling passage 44, and branched passages 46, 47) between the pressurization pump 69A, the master cut valve 42, and the booster valves 50, 51 by operating the pressurization pump 69A. The brake liquid pressure piping therebetween is hereinafter collectively referred to as "pressure adjusting unit upstream piping". When the master cut valve 42 is in the open state and the master cylinder pressure Pmc is being generated during the supply of the pressurized brake pressure Pba, the brake liquid pressure (hereinafter also referred to as "pressure adjusting unit upstream brake pressure") Psm in which the master cylinder pressure Pmc and the pressurized brake pressure Pba are combined is supplied to the pressure adjusting unit upstream piping.

In the second brake liquid pressure circuit system, the pressurized brake pressure Pba is supplied to the pressure adjusting unit upstream piping (upstream side of booster valves 52, 53 on pump discharge side passage 67b, coupling passage 45, and branched passages 48, 49) between the pressurization pump 69B, the master cut valve 43, and the booster valves 52, 53 by operating the pressurization pump 69B. In this case, when the master cut valve 43 is in the open state and the master cylinder pressure Pmc is being generated, the pressure adjusting unit upstream brake pressure Psm in which the master cylinder pressure Pmc and the pressurized brake pressure Pba are combined is supplied to the pressure adjusting unit upstream piping.

The electric motor 68 is driven by the power supply from a battery (not illustrated). Each pressurization pump 69A, 69B may be driven by an individual electric motor.

A piston pump in which the brake liquid is taken in and discharged by the reciprocating movement of the piston built therein is used for the pressurization pumps 69A, 69B of the present embodiment. Such pressurization pumps 69A, 69B are hereinafter referred to as "piston pumps 69A, 69B". In the present embodiment, a so-called opposed type piston pump 69 in which the piston pumps 69A, 69B are arranged facing each other will be described by way of example.

For instance, the opposed type piston pump 69 includes two pistons 691A, 691B accommodated in a housing 690, and elastic members 692A, 692B such as a helical spring for pushing back the pistons 691A, 691B pushed in one direction to the other direction. The housing 690 is formed with piston operation chambers 693A, 693B for reciprocating the pistons 691A, 691B. The piston operation chambers 693A, 693B are formed to communicate with the pump passages 66, 67, respectively. In such opposed type piston pump 69, the piston 691A, the elastic member 692A, and the piston operation chamber 693A configure the pressurization pump 69A of the first brake liquid pressure circuit system, and the piston 691B, the elastic member 692B, and the piston operation chamber 693B configure the pressurization pump 69B of the second brake liquid pressure circuit system.

The pistons 691A, 691B move through the piston operation chambers 693A, 693B by the elastic force of the elastic members 692A, 692B, respectively, to take in the brake liquid from the pump intake side passages 66a, 67a. Such brake liquid flows into the piston operation chambers 693A, 693B, and is discharged to the pump discharge side passages 66b, 67b by moving the pistons 691A, 691B in the direction opposite to the previous moving direction.

Figure 2:
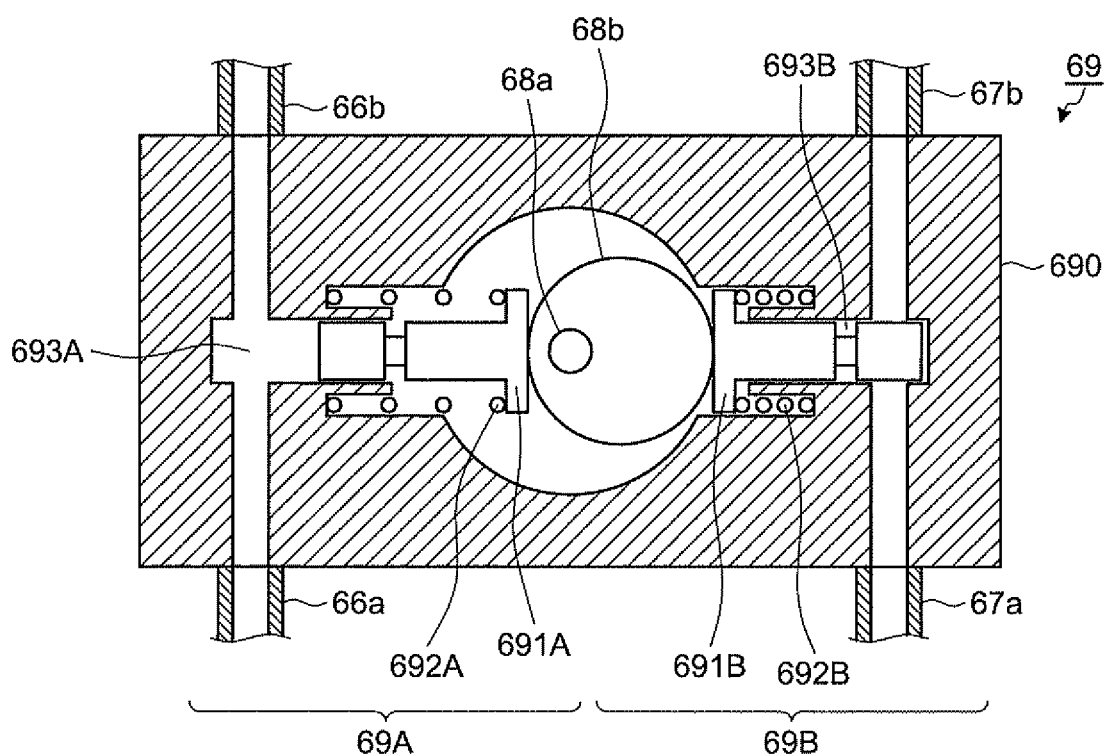
FIG. 2 is a cross-sectional view showing one example of an internal configuration of an opposed type piston pump.

The movement of the pistons 691A, 691B in the opposite direction is carried out using the power of the electric motor 68. As shown in FIG. 2, an eccentric cam 68b is attached to an output shaft 68a of the electric motor 68 with the axis core shifted, and the outer peripheral surface of the eccentric cam 68b is contacted to one end of the pistons 691A, 691B. The eccentric cam 68b rotates with the rotation of the output shaft 68a of the electric motor 68, and pushes the pistons 691A, 691B in the direction against the elastic force of the elastic members 692A, 692B. While the piston 691A is being pushed by the eccentric cam 68b and the discharging operation of the brake liquid is being carried out, the other piston 691B is pushed back by the elastic force of the elastic member 692B, and the intake operation of the brake liquid is carried out. On the other hand, when the piston 691A is being pushed back by the elastic force of the elastic member 692A, and the intake operation of the brake liquid is being carried out, the other piston 691B is pushed by the eccentric cam 68b and the discharging operation of the brake liquid is carried out.

The pump discharge side passages 66b, 67b include orifices 71, 72, respectively. In the piston pumps 69A, 69B, the master cylinder pressure Pmc becomes difficult to act on the discharge port by arranging such orifices 71, 72, and hence the discharging operation of the brake liquid will not be inhibited.

The brake liquid pressure adjusting means 40 includes intake passages 73, 74 for connecting the upstream side of the master cut valves 42, 43 in the first and second brake liquid pressure pipings 24, 25 and the auxiliary reservoirs 64, 65, respectively. Reservoir cut check valves 75, 76 are arranged on the auxiliary reservoirs 64, 65 sides of the respective intake passages 73, 74.

The braking device of the present embodiment configured as above has the operation at the time of braking control controlled by the electronic control unit 1.

Specifically, the electronic control unit 1 receives the operation amount of the brake pedal 10 detected by a brake pedal operation amount detecting means 11 shown in FIG. 1, and the master cylinder pressure Pmc detected by the master cylinder pressure sensor 41. That is, the electronic control unit 1 receives the information of the brake pedal operation amount detected when the driver makes the brake request by the operation of the brake pedal 10, and the information of the master cylinder pressure Pmc generated with such operation. The operation amount of the brake pedal 10 includes the depression amount and the pedal depression force of the brake pedal 10. Thus, the brake pedal operation amount detecting means 11 may be a pedal stroke sensor or a pedal depression force sensor.

The request vehicle braking force calculating means of the electronic control unit 1 calculates the request vehicle braking force of the driver based on the operation amount of the brake pedal 10. For instance, the request vehicle braking force is obtained through a calculation method well known in the art. The brake liquid pressure controlling means of the electronic control unit 1 controls the brake liquid pressure adjusting means 40 so that the request vehicle braking force acts on the vehicle by the sum of the braking forces of all the wheels $W_{FL}$, $W_{FR}$, $W_{RL}$, $W_{RR}$. The brake liquid pressure is distributed to the respective braking force generating means $30_{FL}$, $30_{FR}$, $30_{RL}$, $30_{RR}$ at a predetermined distribution ratio or at a distribution ratio corresponding to the state of the vehicle.

The brake liquid pressure controlling means controls the brake liquid pressure adjusting unit to be controlled to the pressure boost mode when increasing the braking force of the wheels $W_{FR}$, $W_{RL}$, $W_{RR}$, $W_{FL}$. In this case, the brake liquid pressure controlling means controls the master cut valves 42, 43 and the booster valves 50, 51, 52, 53 corresponding to the wheels $W_{FR}$, $W_{RL}$, $W_{RR}$, $W_{FL}$ to the open state, and the depressurization valves 58, 59, 60, 61 to the closed state.

For instance, if the request vehicle braking force can be generated without driving the piston pumps 69A, 69B, that is, if the request vehicle braking force can be acted on the vehicle at the master cylinder pressure Pmc, the brake liquid pressure controlling means performs the control so as not to drive the piston pumps 69A, 69B by stopping the electric motor 68. In this case, the master cylinder pressure Pmc is supplied to the braking force generating means $30_{FL}$, $30_{FR}$, $30_{RL}$, $30_{RR}$ as the brake cylinder pressure Pbc, and the braking force corresponding to the brake cylinder pressure Pbc (=Pmc) generates at the wheels $W_{FL}$, $W_{FR}$, $W_{RL}$, $W_{RR}$. In this case, the master cylinder pressure Pmc increases and decreases according to the operation amount of the brake pedal 10 of the driver. Therefore, the braking force generated at the wheels $W_{FL}$, $W_{FR}$, $W_{RL}$, $W_{RR}$ in this case has a magnitude corresponding to the operation amount of the brake pedal 10 of the driver. In the present embodiment, the sum of the braking forces of the wheels $W_{FL}$, $W_{FR}$, $W_{RL}$, $W_{RR}$ generated without driving the piston pumps 69A, 69B is referred to as the "reference vehicle braking force". At the time of such normal brake request, the pressure adjusting unit upstream brake pressure Psm and the brake cylinder pressure Pbc are at the master cylinder pressure Pmc (Psm=Pbc=Pmc).

On the other hand, even if the reference vehicle braking force is generated by the master cylinder pressure Pmc, the reference vehicle braking force may not satisfy the request vehicle braking force. For instance, when a sudden depression speed of the brake pedal 10 exceeding a predetermined speed is detected, determination is made that the vehicle braking force stronger than that corresponding to the operation amount of the brake pedal 10 is requested and the request vehicle braking force calculating means requests the request vehicle braking force greater than at the time of the normal brake request, and hence the request vehicle braking force may not be generated at the vehicle with only the reference vehicle braking force based on the master cylinder pressure Pmc. Therefore, the brake liquid pressure controlling means in this case determines that the pressurization brake request is made, and performs the BA (Brake Assist) control of causing the vehicle to generate the request vehicle braking force while compensating for the lack of operation amount of the brake pedal 10. Specifically, the brake liquid pressure controlling means controls the electric motor 68 and drives the piston pumps 69A, 69B, and supplies the pressurized brake pressure Pba to the upstream piping of the pressure adjusting unit. In this case, the pressure adjusting unit upstream brake pressure Psm of the upstream piping of the pressure adjusting unit has a magnitude of the master cylinder pressure Pmc and the pressurized brake pressure Pba combined (Psm=Pmc+Pba). The brake liquid pressure controlling means adjusts the opening degree of the booster valves 50, 51, 52, 53 as necessary, and the brake liquid pressure lower than the pressure adjusting unit upstream brake pressure Psm is supplied to the braking force generating means $30_{FL}$, $30_{FR}$, $30_{RL}$, $30_{RR}$ as the brake cylinder pressure Pbc (Psm>Pbc). The opening degree of the booster valves 50, 51, 52, 53 is determined based on the request vehicle braking force. The braking force corresponding to the brake cylinder pressure Pbc thus generates at the wheels $W_{FL}$, $W_{FR}$, $W_{RL}$, $W_{RR}$, and the request vehicle braking force acts on the vehicle. The depression speed of the brake pedal 10 can be calculated based on the operation amount of the brake pedal 10 and the elapsed time of the operation, but means for detecting the depression speed (brake operation speed detecting means) may be separately arranged.

When reducing the braking force of the wheels $W_{FR}$, $W_{RL}$, $W_{RR}$, $W_{FL}$, the brake liquid pressure controlling means controls the brake liquid pressure adjusting unit to be controlled to the depressurization mode. The brake liquid pressure controlling means in this case controls the master cut valves 42, 43 and the booster valves 50, 51, 52, 53 corresponding to the wheels $W_{FR}$, $W_{RL}$, $W_{RR}$, $W_{FL}$ to the closed state, and the depressurization valves 58, 59, 60, 61 to the open state. Thus, in the wheels $W_{FR}$, $W_{RL}$, $W_{RR}$, $W_{FL}$ to be controlled, the brake cylinder pressure Pbc to supply to the braking force generating means $30_{FR}$, $30_{RL}$, $30_{RR}$, $30_{FL}$ is depressurized, and the braking force reduces. In this case, the piston pumps 69A, 69B are controlled to the non-driven state.

The brake liquid pressure controlling means controls the brake liquid pressure adjusting unit to the holding mode after boosting or depressurizing the brake cylinder pressure Pbc of the braking force generating means $30_{FR}$, $30_{RL}$, $30_{RR}$, $30_{FL}$ to be controlled. The brake liquid pressure controlling means in this case controls the master cut valves 42, 43, the booster valves 50, 51, 52, 53 and the depressurization valves 58, 59, 60, 61 of the wheels $W_{FR}, W_{RL}, W_{RR}, W_{FL}$ to be controlled to be in the closed state. The brake cylinder pressure Pbc of the braking force generating means $30_{FL}, 30_{FR}, 30_{RL}, 30_{RR}$ is thereby held at a constant magnitude in the wheels $W_{FL}, W_{FR}, W_{RL}, W_{RR}$ to be controlled.

The braking device can execute ABS (Antilock Brake System) control by alternately switching the pressure boost mode and the depressurization mode, or alternately switching the pressure boost mode, the depressurization mode, and the holding mode. The brake liquid pressure controlling means mainly controls the switching operation so that the wheels $W_{FL}, W_{FR}, W_{RL}, W_{RR}$ are not in a wheel lock state or a wheel slip state. The wheel lock state and the wheel slip state may be determined based on the rotation speed (wheel speed) of each wheel $W_{FL}, W_{FR}, W_{RL}, W_{RR}$ detected by wheel speed detecting means $81_{FL}, 81_{FR}, 81_{RL}, 81_{RR}$.

The braking device is also used for the vehicle behavior control for stabilizing the behavior of the vehicle. The vehicle behavior control may stabilize the position at the time of vehicle pivoting, and is executed by a vehicle behavior control device. In the present embodiment, the vehicle behavior control device is also prepared as one function of the electronic control unit 1.

Figure 3:
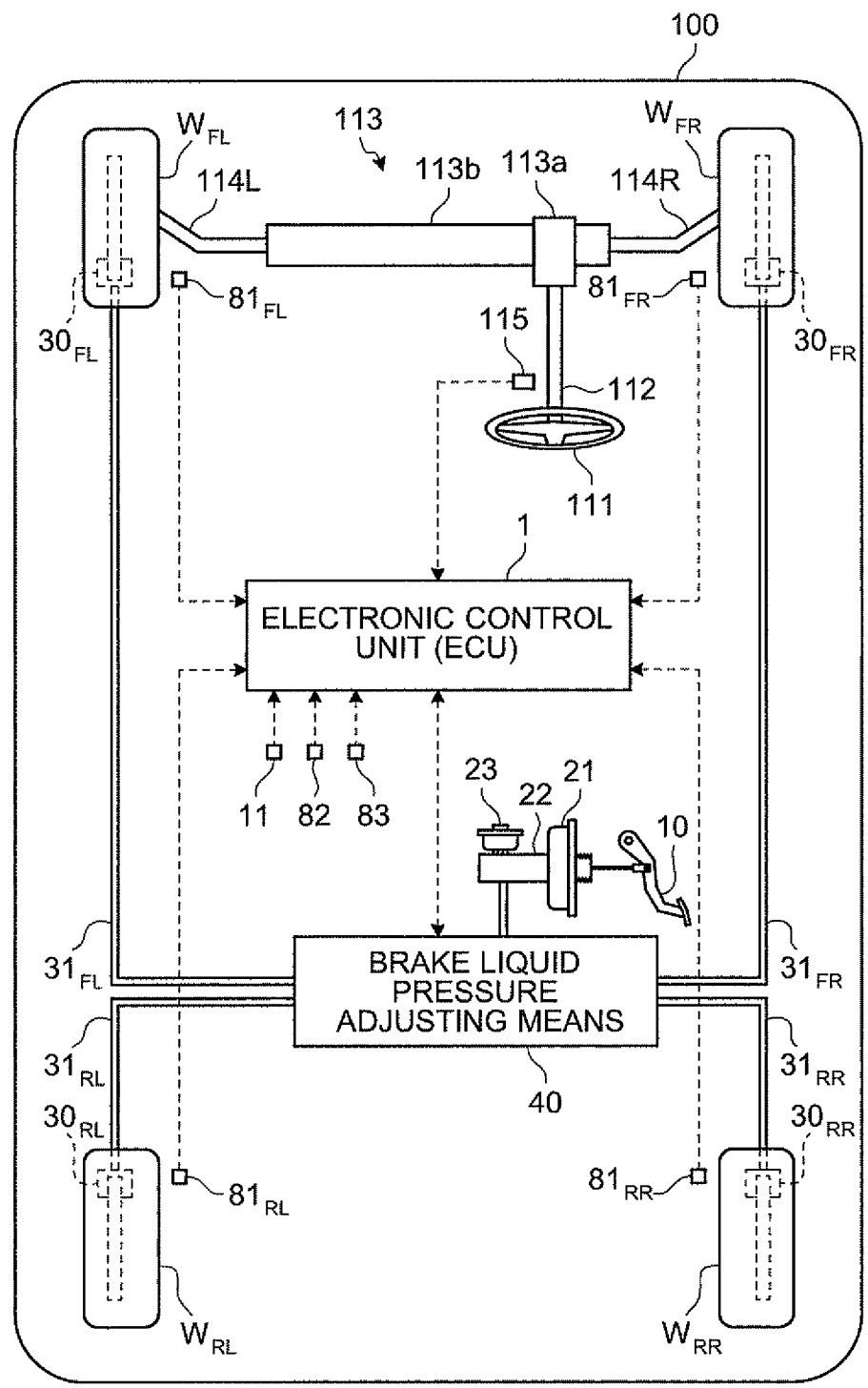
FIG. 3 is a view showing one example of a vehicle to be applied with the brake controlling apparatus according to the present invention.

One example of a vehicle 100 applied with the braking device and the vehicle behavior control device thereof is shown in FIG. 3.

A steering device for steering the steering wheel $W_{FL}, W_{FR}$ by the steering operation of the driver is prepared in the vehicle 100. The steering device includes a steering wheel 111 to be operated by the driver, a steering shaft 112 coupled to the steering wheel 111, a steering torque transmitting means 113 for transmitting the steering torque of the steering shaft 112 towards the left and right steering wheels $W_{FL}, W_{FR}$, tie rods 114L, 114R for coupling the steering torque transmitting means 113 and each steering wheel $W_{FL}, W_{FR}$, and a steering operation amount detecting means 115 for detecting the steering operation amount of the steering wheel 111 by the driver.

The steering torque transmitting means 113 is a so-called rack and pinion mechanism configured by a pinion gear 113a arranged at a distal end of the steering shaft 112 and a rack gear 113b that meshes with the pinion gear 113a. In the steering device, the left and right tie rods 114L, 114R are respectively coupled to the both ends of the rack gear 113b, and each steering wheel $W_{FL}, W_{FR}$ coupled to each tie rod 114L, 114R is rolled with the movement of the rack gear 113b.

The steering operation amount is such as a steering angle. The steering operation amount detecting means 115 detects the steering angle from the rotation angle of the steering shaft 112 and transmits the detection signal to the electronic control unit 1. The steering angular speed is calculated based on the amount of change by the elapse of time of the steering angle in the electronic control unit 1.

The steering device in which the steering wheel 111 and the steering wheels $W_{FL}, W_{FR}$ are mechanically connected is illustrated, but the steering device may be a so-called steer by wire type in which mechanical connection is not made.

The vehicle behavior controlling means of the vehicle behavior control device (electronic control unit 1) determines the behavior at the time of pivoting of the vehicle 100 based on the steering angle detected by the steering operation amount detecting means 115, the yaw rate detected by a yaw rate sensor 82, and the vehicle transverse acceleration detected by a vehicle transverse acceleration detecting means 83 shown in FIG. 3. If detected as a result of the determination that an excessively large yaw moment My1 acts on the vehicle body, the vehicle behavior controlling means performs the control to suppress the excessively large yaw moment My1 to enable a stable pivoting operation. In this case, the vehicle behavior controlling means determines that the pressurization brake request is made and transmits a command to the brake liquid pressure controlling means, and applies the requested braking force for generating the yaw moment My2 (<My1) in the direction opposite to the excessively large yaw moment My1 at the vehicle body at the pivoting outer wheels (left front wheel $W_{FL}$ or right front wheel $W_{FR}$) on the front side. That is, the vehicle behavior controlling means performs the so-called VSC (Vehicle Stability Control) control.

When performing the vehicle behavior control, the brake liquid pressure controlling means that received the command controls the brake liquid pressure adjusting means 40 in the following manner to generate the desired requested braking force at the pivoting wheels (left front wheel $W_{FL}$ or right front wheel $W_{FR}$) on the front side to be controlled. The brake liquid pressure controlling means in this case steps up the brake cylinder pressure Pbc with respect to the wheel to be controlled while alternately repeating boosting and holding, and controls the brake liquid pressure adjusting unit to be controlled to apply the requested braking force that realizes the yaw moment My2 in the opposite direction on the relevant wheel. Therefore, if boosting of the brake cylinder pressure Pbc is requested, the brake liquid pressure controlling means controls the booster valves 50, 53 corresponding to the wheels (left front wheel $W_{FL}$ or right front wheel $W_{FR}$) to be controlled to the open state, and also controls the master cut valves 42, 43 and the depressurization valves 58, 61 to the close state, and also controls the electric motor 68 to drive the piston pumps 69A, 69B. On the other hand, if holding of the brake liquid pressure is requested, the brake liquid pressure controlling means closes the booster valves 50, 53 from the boosted state. That is, when performing the vehicle behavior control, the brake liquid pressure controlling means alternately repeats opening and closing with respect to the booster valves 50, 53 corresponding to the wheels to be controlled.

The piston pumps 69A, 69B of the braking device have an intake stroke and a discharge stroke of the brake liquid while the pistons 691A, 691B reciprocate once, where a dischargeable period (hereinafter referred to as "pump dischargeable period") Tpq and a non-dischargeable period (hereinafter referred to as "pump non-dischargeable period") Tp0 of the brake liquid alternately exist during that time (i.e., during one cycle Tp). When the pump non-dischargeable period Tp0 and the boost request period (i.e., opening period Tvopen of booster valve 53 or booster valve 50) of the brake cylinder pressure Pbc to the wheel (left front wheel $W_{FL}$ or right front wheel $W_{FR}$) to be controlled overlap, the pressurized brake pressure Pba having the magnitude similar to that in the pump dischargeable period Tpq is not supplied to the pressure adjusting unit upstream piping and the brake cylinder pressure Pbc becomes lower than the requested value. In other words, in the braking device for pressurizing the brake liquid pressure of the pressure adjusting unit upstream piping (i.e., upstream side of booster valves 50, 51, 52, 53) by the piston pumps 69A, 69B, the pressure adjusting unit upstream brake pressure Psm of the pressure adjustment unit upstream piping involves the pulse pressure fluctuation depending on the setting of the duty ratio (i.e., opening period (hereinafter also referred to as "booster valve opening period")) Tvopen and closing period (hereinafter also referred to as "booster valve closing period") of the booster valves 50, 51, 52, 53 since the piston pumps 69A, 69B include the pump dischargeable period Tpq and the pump non-dischargeable period Tp0 during one cycle Tp. Thus, when the periods overlap during the execution of the vehicle behavior control, the step-up gradient of the brake cylinder pressure Pbc to be supplied to the wheel to be controlled becomes small, whereby it constantly becomes difficult to step up the brake cylinder pressure Pbc to the requested value than in the state in which the brake liquid is discharged from the pump. Therefore, the desired brake cylinder pressure Pbc becomes difficult to be supplied to the relevant wheel at an appropriate timing in this case, and hence the yaw moment My2 in the opposite direction by the application of the braking force on the wheel cannot be generated at the vehicle at an optimum timing, and the control accuracy of the brake liquid pressure in the vehicle behavior control may lower.

In the present braking device in which the pressure adjusting unit upstream brake pressure Psm is maintained constant with the piston pumps 69A, 69B, the pressure adjusting unit upstream brake pressure Psm immediately lowers and the brake cylinder pressure Pbc becomes difficult to be raised when stepping up the downstream side of the booster valves 50, 51, 52, 53 (i.e., brake cylinder pressure Pbc of the braking force generating means $30_{FR}$, $30_{RL}$, $30_{RR}$, $30_{FL}$) by the repeated operation of opening and closing the booster valves 50, 51, 52, 53 since the discharge amount of the brake liquid from the piston pumps 69A, 69B is generally small.

At the time of braking control, the master cylinder pressure Pmc involved in the brake operation of the driver is generated. The master cylinder pressure Pmc increases and decreases according to the operation amount of the brake pedal 10, and may become high or low with respect to the brake cylinder pressure Pbc by the brake operation of the driver. When the master cylinder pressure Pmc has a pressure of greater than or equal to the brake cylinder pressure Pbc, the pressure adjusting unit upstream brake pressure Psm (=Pmc) on the upstream side of the booster valves 50, 51, 52, 53 has a pressure of greater than or equal to the brake cylinder pressure Pbc, so that the brake cylinder pressure Pbc can be stepped up based on the master cylinder pressure Pmc. That is, in this case, the master cylinder pressure Pmc is greater than or equal to the brake cylinder pressure Pbc and is less likely to be subjected to the influence of the pulse pressure fluctuation even if the piston pumps 69A, 69B are operated as necessary, and thus the brake cylinder pressure Pbc can be stepped up as desired by the setting of the duty ratio of the booster valves 50, 51, 52, 53 (i.e., normal open/close control of booster valves 50, 51, 52, 53) similar to the conventional art.

When the brake cylinder pressure Pbc is higher than the master cylinder Pmc, the pressure adjusting unit upstream brake pressure Psm (=Pmc) on the upstream side of the booster valves 50, 51, 52, 53 is lower than the brake cylinder pressure Pbc, and the pressurized brake pressure Pba involved in the operation of the piston pumps 69A, 69B becomes necessary to step up the brake cylinder pressure Pbc. When performing the vehicle behavior control described above as well, the pressurized brake pressure Pba of the piston pumps 69A, 69B is required to step up the brake cylinder pressure Pbc of the wheels $W_{FL}$, $W_{FR}$, $W_{RL}$, $W_{RR}$ to be controlled. However, if the repeated operation of opening and closing the booster valves 50, 51, 52, 53 is carried out in stepping up, the brake cylinder pressure Pbc may not be stepped up as desired due to the lowering of the pressure adjusting unit upstream brake pressure Psm involved in the pulse pressure fluctuation and the opening of the booster valves 50, 51, 52, 53.

The brake controlling apparatus of the present embodiment, is configured to supply the brake cylinder pressure Pbc having a desired magnitude at a desired timing at the time of request to boost the brake cylinder pressure Pbc with respect to the wheels $W_{FL}$, $W_{FR}$, $W_{RL}$, $W_{RR}$ to be controlled even when the piston pumps 69A, 69B are used as pressurizing means of the brake liquid of the braking device.

Specifically, the booster valves 50, 51, 52, 53 described above perform the opening operation and the closing operation based on the set duty ratio (ratio between the closing period Tvclose and the opening period Tvopen). Thus, in the present embodiment, control is performed such that the pump dischargeable period Tpq of the target piston pumps 69A, 69B appears in the opening period Tvopen of the booster valves 50, 51, 52, 53 related to the wheels $W_{FR}$, $W_{RL}$, $W_{RR}$, $W_{FL}$ to be controlled by adjusting the duty ratio.

For instance, the duty ratio is to be set so that the opening period Tvopen of the booster valve becomes at least the pump dischargeable period Tpq (½ cycle of piston pumps 69A, 69B). When the open/close control of the booster valves 50, 51, 52, 53 to be controlled is carried out based on the duty ratio, the pump dischargeable period Tpq of the piston pumps 69A, 69B appears in the opening period Tvopen of the booster valves 50, 51, 52, 53, and hence the lowering of the pressure adjusting unit upstream brake pressure Psm involved in the pulse pressure fluctuation and the opening of the booster valves 50, 51, 52, 53 can be suppressed, and the brake cylinder pressure Pbc can be stepped up at the desired magnitude and timing without causing lowering of the step-up gradient.

However, the responsiveness of the discharge of the brake liquid of the piston pumps 69A, 69B is inferior to the responsiveness of the opening of the booster valves 50, 51, 52, 53. Thus, if the pump dischargeable period Tpq and the opening period Tvopen of the booster valve are completely coincided, the pressurized brake pressure Pba pressurized by the piston pumps 69A, 69B cannot reach the pressure adjusting unit upstream piping (i.e., upstream side of booster valves 50, 51, 52, 53) and the desired brake liquid pressure may not be transmitted to the wheels $W_{FR}$, $W_{RL}$, $W_{RR}$, $W_{FL}$ to be controlled at the beginning of the opening of the booster valves 50, 51, 52, 53. Therefore, the brake liquid pressure controlling means desirably sets the duty ratio so that the opening period Tvopen of the booster valves 50, 51, 52, 53 related to the wheels $W_{FR}$, $W_{RL}$, $W_{RR}$, $W_{FL}$ to be controlled becomes longer than the pump dischargeable period Tpq in the piston pumps 69A, 69B.

Figure 4:
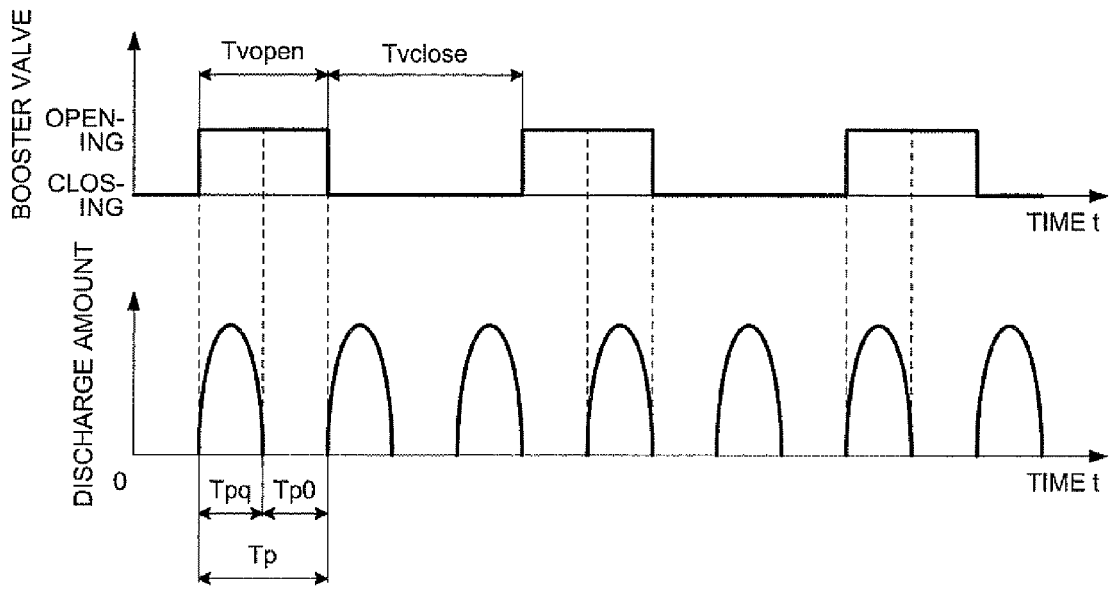
FIG. 4 is a view describing the relationship of a booster valve opening period and a pump dischargeable period.
Figure 5:
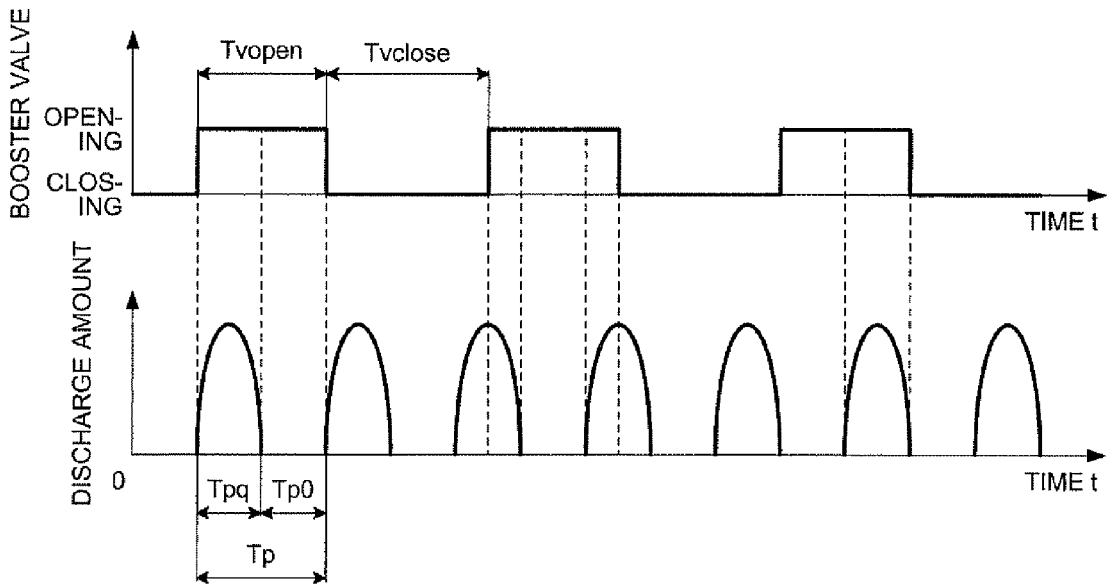
FIG. 5 is another view describing the relationship of the booster valve opening period and the pump dischargeable period.

When the opening period Tvopen of the booster valve is shorter than one cycle Tp (=pump dischargeable period Tpq+ pump non-dischargeable period Tp0) of the piston pumps 69A, 69B, the opening period Tvopen of the booster valve cannot be made longer than the pump dischargeable period Tpq on a constant basis unless the duty ratio of the booster valves 50, 51, 52, 53 is changed for every one cycle. Therefore, in the present embodiment, the duty ratio is set so that the opening period Tvopen of the booster valve becomes a period of longer than or equal to at least one cycle Tp of the piston pumps 69A, 69B, that is one cycle or more of the electric motor 68, as shown in FIG. 4. The one cycle Tp of the piston pumps 69A, 69B changes according to the output rotation number of the electric motor 68, and is the inverse number of the output rotation number per one second of the electric motor 68. The output rotation number of the electric motor 68 can be grasped by the application voltage to the electric motor 68. Therefore, in the brake liquid pressure controlling means of the present embodiment, the duty ratio in which the open valve period Tvopen of the booster valves 50, 51, 52, 53 related to the wheels $W_{FR}$, $W_{RL}$, $W_{RR}$, $W_{FL}$ to be controlled becomes at least an inverse number of the output rotation number per one second of the electric motor 68 is set, and the open/close state of the booster valves 50, 51, 52, 53 is controlled based on such duty ratio.

As shown in FIG. 4, the pump dischargeable period Tpq appears during the opening period Tvopen of the booster valve on a constant basis by setting the duty ratio of the booster valves 50, 51, 52, 53 that satisfies the condition.

The duty ratio of the booster valves 50, 51, 52, 53 may vary the opening period Tvopen of the booster valve or the closing period Tvclose of the booster valve as long as the condition that the opening period Tvopen of the booster valve becomes at least one cycle Tp of the piston pumps 69A, 69B. For instance, the set state shown in FIG. 5 in which the closing period Tvclose of the booster valve is shortened may be realized from the set state of FIG. 4, in which case, the pump dischargeable period Tpq for one cycle Tp always appears during one opening period Tvopen of the booster valve.

Figure 6:
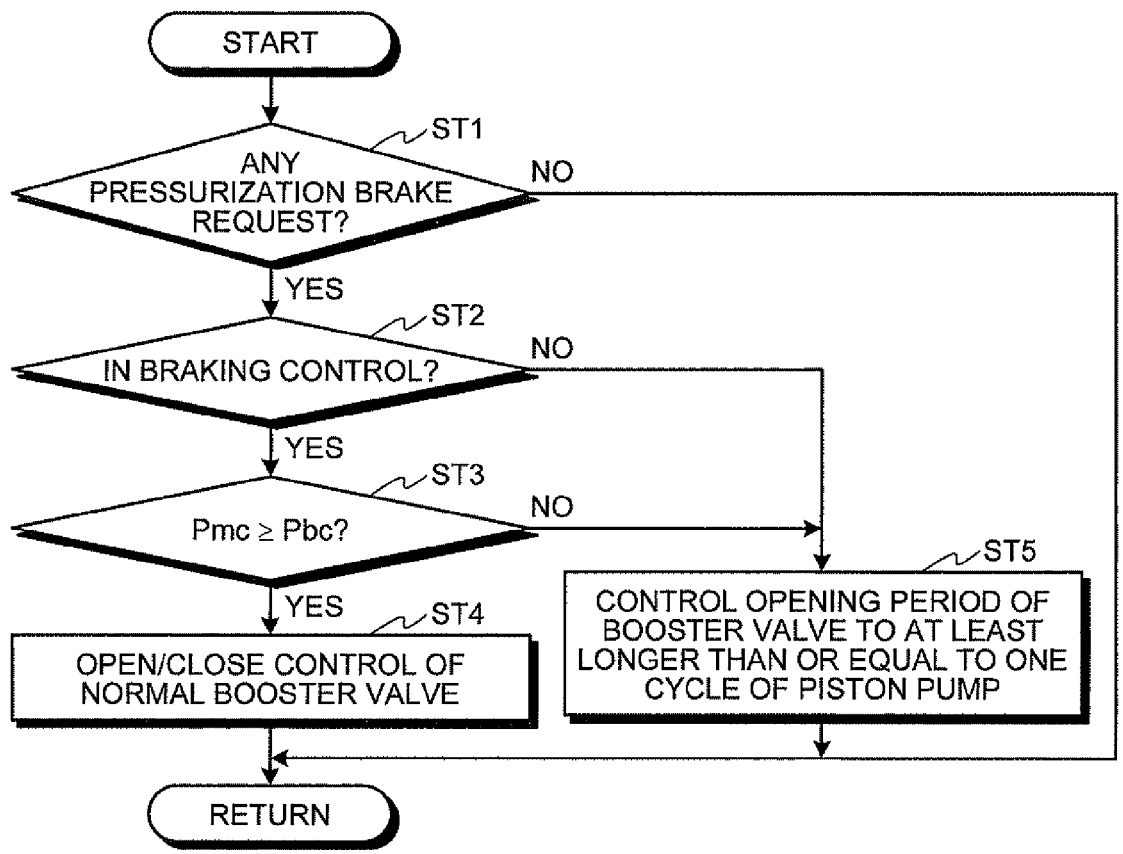
FIG. 6 is a flowchart describing the operation of the brake controlling apparatus according to the present invention.

For instance, as shown in the flowchart of FIG. 6, the brake liquid pressure controlling means of the present embodiment performs a determination on whether or not the pressurization brake request is made (step ST1). If the pressurization brake request is not made, the brake liquid pressure controlling means once terminates the present operation.

When determined that the pressurization brake request is made in step ST1, the brake liquid pressure controlling means performs a determination on whether or not in braking control (step ST2).

For instance, when an instruction of ABS control is made and determination is made as in braking control in step ST2, the brake liquid pressure controlling means compares the master cylinder pressure Pmc and the brake cylinder pressure Pbc to determine whether or not the master cylinder pressure Pmc is greater than or equal to the brake cylinder pressure Pbc (step ST3). A value detected by the master cylinder pressure sensor 41 is used for the master cylinder pressure Pmc. As shown in FIG. 1, pressure sensors $32_{FL}, 32_{FR}, 32_{RL}, 32_{RR}$ may be arranged in the respective brake liquid pressure pipings $31_{FL}, 31_{FR}, 31_{RL}, 31_{RR}$, and the detection values of the pressure sensors $32_{FL}, 32_{FR}, 32_{RL}, 32_{RR}$ may be used for the brake cylinder pressure Pbc.

When determined that the master cylinder pressure Pmc is greater than or equal to the brake cylinder pressure Pbc in step ST3 (Psm>Pmc≧Pbc), the brake liquid pressure controlling means executes the usual open/close control of the booster valves 50, 51, 52, 53 (step ST4) since the influence of the pulse pressure fluctuation is less likely to be received. In this case, the brake liquid pressure controlling means open/close controls the booster valves 50, 51, 52, 53 to be controlled according to the set duty ratio similar to the conventional art, and operates the piston pumps 69A, 69B as necessary if the requesting value of the brake cylinder pressure Pbc is high. Thus, the brake cylinder pressure Pbc of the wheels $W_{FL}$, $W_{FR}$, $W_{RL}$, $W_{RR}$ to be controlled steps up to the requesting value at the appropriate magnitude and timing with the repeated open/close operation of the booster valves 50, 51, 52, 53. Therefore, the braking force generates at the desired appropriate magnitude and timing with respect to the wheels $W_{FL}$, $W_{FR}$, $W_{RL}$, $W_{RR}$ to be controlled in the braking control in this case.

When determined that the master cylinder pressure Pmc is lower than the brake cylinder pressure Pbc in step ST3 (Psm>Pbc>Pmc), the duty ratio at which the opening period Tvopen of the booster valves 50, 51, 52, 53 to be controlled becomes at least greater than or equal to one cycle Tp (one cycle of the electric motor 68) of the piston pumps 69A, 69B is set in the brake liquid pressure controlling means to avoid the influence of lowering of the pressure adjusting unit upstream brake pressure Psm involved in the pulse pressure fluctuation and the opening of the booster valves 50, 51, 52, 53, and the open/close control of the booster valves 50, 51, 52, 53 based on the duty ratio is executed (step ST5). In this case, the brake liquid pressure controlling means operates the piston pumps 69A, 69B but has the pump dischargeable period Tpq of the piston pumps 69A, 69B constantly appearing in the opening period Tvopen of the booster valve by the duty ratio, and thus can supply the brake cylinder pressure stepped up at the desired magnitude and timing to the braking force generating means $30_{FR}, 30_{RL}, 30_{RR}, 30_{FL}$ of the wheels $W_{FR}, W_{RL}, W_{RR}, W_{FL}$ to be controlled without being influenced by the lowering of the pressure adjusting unit upstream brake pressure Psm involved in the pulse pressure fluctuation and the opening of the booster valves 50, 51, 52, 53. Therefore, in the braking control in this case, the braking force can be generated with respect to the wheels $W_{FL}, W_{FR}, W_{RL}, W_{RR}$ to be controlled at the desired appropriate magnitude and timing by the brake cylinder pressure Pbc of satisfactory control accuracy. That is, in such a case, the braking control of satisfactory control accuracy can be carried out even if inexpensive piston pumps 69A, 69B are used for the pressurization of the brake liquid.

When the vehicle behavior control (not only VSC control but include also TRC (traction control system) control) is made and determination is made as not in braking control in step ST2 (Psm>Pbc>Pmc≅0), the brake liquid pressure controlling means proceeds to step ST5 and sets the duty ratio of the booster valves 53, 50 of the wheels (left front wheel $W_{FL}$ or right front wheel $W_{FR}$) to be controlled and performs the open/close control of the booster valves 53, 50 based on such duty ratio. In such case as well, the brake liquid pressure controlling means can supply the brake cylinder pressure Pbc stepped up at the desired magnitude and timing to the braking force generating means $30_{FL}$ or the braking force generating means $30_{FR}$ of the wheels to be controlled without being influenced by the lowering of the pressure adjustment upstream brake pressure Psm involved in the pulse pressure fluctuation and the opening of the booster valves 53, 50 although the piston pumps 69A, 69B are in operation since the duty ratio at which the opening period Tvopen becomes a period of longer than or equal to at least one cycle Tp (one cycle of the electric motor 68) of the piston pumps 69A, 69B is set. Therefore, the necessary yaw moment My2 in the opposite direction can be generated at the vehicle at an optimum timing in addition to the optimum braking force desired for the predetermined wheel by the brake cylinder pressure Pbc of satisfactory control accuracy in the vehicle behavior control, so that a stable pivoting operation with an excessively large yaw moment suppressed can be carried out. That is, in such a case, the vehicle behavior control of satisfactory control accuracy can be carried out using the inexpensive piston pumps 69A, 69B for the pressurization of the brake liquid.

As described above, when the master cylinder pressure Pmc during the braking control is lower than the brake cylinder pressure Pbc or in the vehicle behavior control and the boost request of the brake cylinder pressure Pbc by the pressurized brake pressure Pba is made with respect to the wheels $W_{FR}, W_{RL}, W_{RR}, W_{FL}$ to be controlled, the brake controlling apparatus (brake liquid pressure controlling means) of the present embodiment sets the duty ratio of the booster valves 50, 51, 52, 53 related to the wheels $W_{FR}, W_{RL}, W_{RR}, W_{FL}$ to be controlled to the value described above (at which the pump dischargeable period Tpq for one cycle Tp of the target piston pumps 69A, 69B constantly appear during the opening period Tvopen of the booster valves 50, 51, 52, 53). The brake controlling apparatus (brake liquid pressure controlling means) performs the open/close control of the booster valves 50, 51, 52, 53 based on the set duty ratio. Therefore, the brake cylinder pressure Pbc stepped up at the desired magnitude and timing without lowering the step up gradient is supplied to the braking force generating means $30_{FL}$, $30_{FR}$, $30_{RL}$, $30_{RR}$ of the wheels $W_{FL}$, $W_{FR}$, $W_{RL}$, $W_{RR}$ to be controlled. Thus, the desired boosted brake cylinder pressure Pbc can be supplied at the appropriate timing corresponding to the boost request can be supplied to the braking force generating means $30_{FR}$, $30_{RL}$, $30_{RR}$, $30_{FL}$ although the piston pumps 69A, 69B, which are advantageous than the gear pump in terms of cost price but cannot always discharge the brake liquid, are used. That is, according to the brake controlling apparatus, the reduction effect of the cost price due to the use of the piston pumps 69A, 69B can be obtained, the lowering of the control accuracy of the brake liquid pressure caused by the structural features of the piston pumps 69A, 69B can be prevented, the optimum brake cylinder pressure Pbc can be supplied to the wheels $W_{FR}$, $W_{RL}$, $W_{RR}$, $W_{FL}$ to be controlled as needed. The brake controlling apparatus is less susceptible to the influence of pulse pressure fluctuation if the master cylinder pressure Pmc during the braking control is greater than or equal to the brake cylinder pressure Pbc, and thus can step up the brake cylinder pressure Pbc to the requesting value at the appropriate magnitude and timing by the duty ratio of the booster valves 50, 51, 52, 53 similar to the conventional art. The brake controlling apparatus thus can ensure the control accuracy of the brake liquid pressure when performing the braking control and the vehicle behavior control even by using the inexpensive piston pumps 69A, 69B.

INDUSTRIAL APPLICABILITY

Therefore, the brake controlling apparatus according to the present invention is useful in a technique of enhancing the control accuracy at the time of the boost request of the brake liquid pressure in the braking device using the piston pump.

The invention claimed is:

1. A brake controlling apparatus of a braking device including a booster valve to be opened at a time of request to boost a pressure of a brake liquid to supply to a wheel to be controlled, and a piston pump for supplying pressurized brake liquid to an upstream side of the booster valve, the brake controlling apparatus comprising:
a brake liquid pressure controlling unit that sets a duty ratio between a closing period and a opening period of the booster valve so that the opening period of the booster valve becomes at least a dischargeable period of the brake liquid in the piston pump, and controls the booster valve based on the duty ratio, wherein
the brake liquid pressure controlling unit sets the duty ratio of the booster valve so that the opening period of the booster valve becomes at least a period of longer than or equal to one cycle of the piston pump, and the brake liquid pressure controlling unit sets the duty ratio of the booster valve so that the opening period of the booster valve becomes at least an inverse number of an output rotation number per one second of the electric motor.

2. A brake controlling apparatus of a braking device including a booster valve to be opened at a time of request to boost a pressure of a brake liquid to supply to a wheel to be controlled, and a piston pump for supplying pressurized brake liquid to an upstream side of the booster valve, the brake controlling apparatus comprising:
a brake liquid pressure controlling unit that sets a duty ratio between a closing period and a opening period of the booster valve so that the opening period of the booster valve becomes at least a dischargeable period of the brake liquid in the piston pump, and controls the booster valve based on the duty ratio, wherein
the brake liquid pressure controlling unit sets the duty ratio of the booster valve based on an output rotation number of an electric motor as a drive source of the piston pump, and the brake liquid pressure controlling unit sets the duty ratio of the booster valve so that the opening period of the booster valve becomes at least an inverse number of an output rotation number per one second of the electric motor.

3. The brake controlling apparatus according to claim 1, wherein the brake liquid pressure controlling unit is configured to set the duty ratio of the booster valve when a master cylinder pressure to apply on the upstream side of the booster valve is lower than the pressure of the brake liquid to the wheel to be controlled.

4. The brake controlling apparatus according to claim 2, wherein the brake liquid pressure controlling unit is configured to set the duty ratio of the booster valve when a master cylinder pressure to apply on the upstream side of the booster valve is lower than the pressure of the brake liquid to the wheel to be controlled.

* * * * *